(12) United States Patent
Stoll et al.

(10) Patent No.: US 6,731,282 B2
(45) Date of Patent: May 4, 2004

(54) SYSTEM AND METHOD FOR PARALLEL RENDERING OF IMAGES

(75) Inventors: Gordon W. Stoll, Redwood City, CA (US); Dan W. Patterson, Scottsdale, AZ (US); Matthew Eldridge, Atherton, CA (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 09/885,623

(22) Filed: Jun. 19, 2001

(65) Prior Publication Data

US 2002/0190979 A1 Dec. 19, 2002

(51) Int. Cl.[7] .................................................. G06T 11/00
(52) U.S. Cl. ...................................................... 345/423
(58) Field of Search .................................. 345/423, 582, 345/531, 1.1, 1.3, 536

(56) References Cited

U.S. PATENT DOCUMENTS 5,530,457 A * 6/1996 Helgeson ..................... 345/531

OTHER PUBLICATIONS

Lightning, No date given, http://graphics.stanford.edu/projects/flashg/lightning/, 3 pages.

Laurent Moll et al., Sepia: Scalable 3D Compositing Using PCI Pamette, Compaq Computer Corporation, Systems Research Center, Proceedings of the Seventh Annual IEEE Symposium on Field–Programmable Custom Computing Machines, No date given, 10 pages.

* cited by examiner

Primary Examiner—Almis R. Jankus
(74) Attorney, Agent, or Firm—Blakely, Sokoloff, Taylor & Zafman LLP

(57) ABSTRACT

A system and method for parallel rendering of images are described. Image information is stored into at least one buffer for display on a plurality of display modules. A predetermined number of image units from said image information are mapped to each display module of said plurality of display modules.

25 Claims, 11 Drawing Sheets

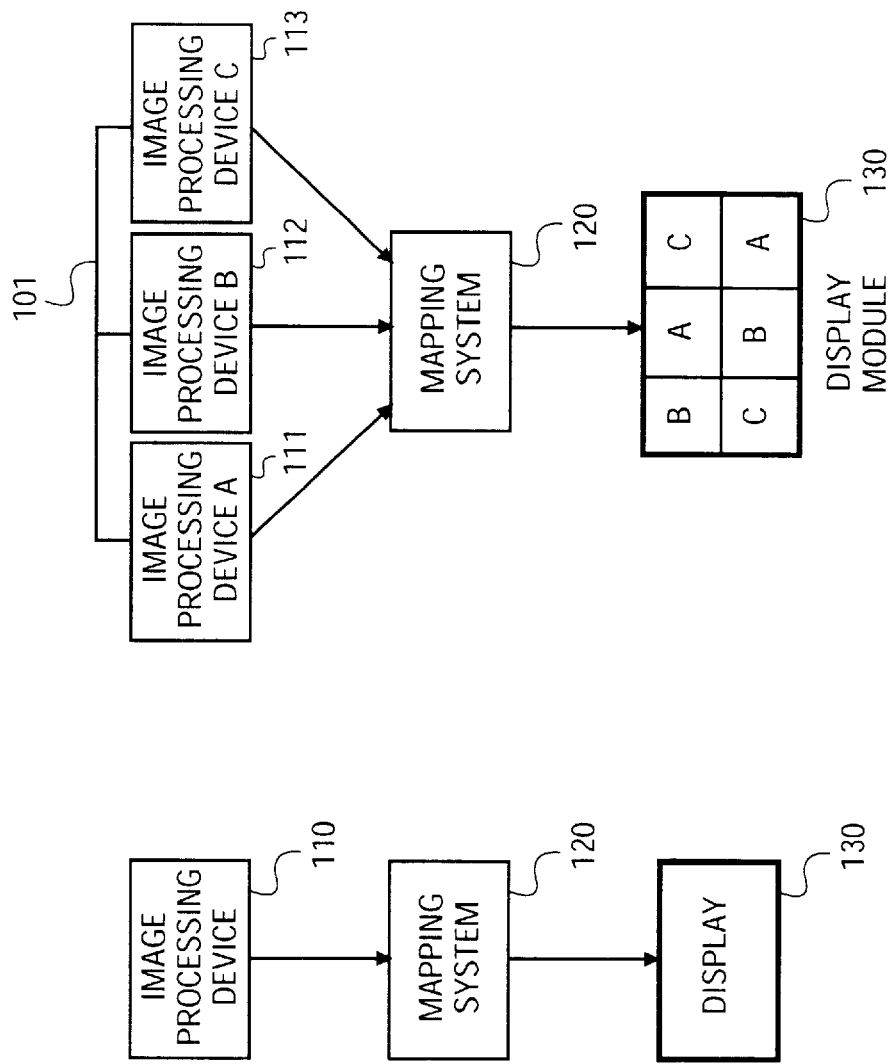

SYSTEM AND METHOD FOR PARALLEL RENDERING OF IMAGES

FIELD OF THE INVENTION

The present invention relates generally to image processing and, more particularly, to a system and method for parallel rendering of images.

BACKGROUND

As graphics applications, for example image rendering applications, become more complex, more powerful computer systems are needed to compute these applications.

Generally, an image processing device, for example a computer system, is connected to a display module, for example a cathode-ray tube (CRT) or an image projector, and displays an image on the display module after processing the image rendering application. However, processing of a complex image rendering application with a single computer system is generally slower and achieves a lower degree of visual resolution.

As a result, clusters of personal computers have become increasingly popular as cost-effective platforms for such supercomputer-class applications. Given continuous performance improvements in graphics accelerators, clusters of personal computers are similarly attractive for complex graphics applications.

However, previous attempts use clusters of personal computers lacked arbitrary scalability in both the number of computer systems and the number of display modules supported and failed to allow any pixel data generated from any computer system to be dynamically mapped to any location of any display module.

BRIEF DESCRIPTION OF THE DRAWINGS

The present invention is illustrated by way of example and not limitation in the figures of the accompanying drawings, in which like references indicate similar elements and in which:

FIG. 2A is a block diagram of an example of the visual computing architecture, having one image processing device and one display module.

FIG. 2B is a block diagram of an alternate example of the visual computing architecture, having multiple image processing devices and one display module.

DETAILED DESCRIPTION

According to embodiments described herein, a system and method for parallel rendering of images are described. In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
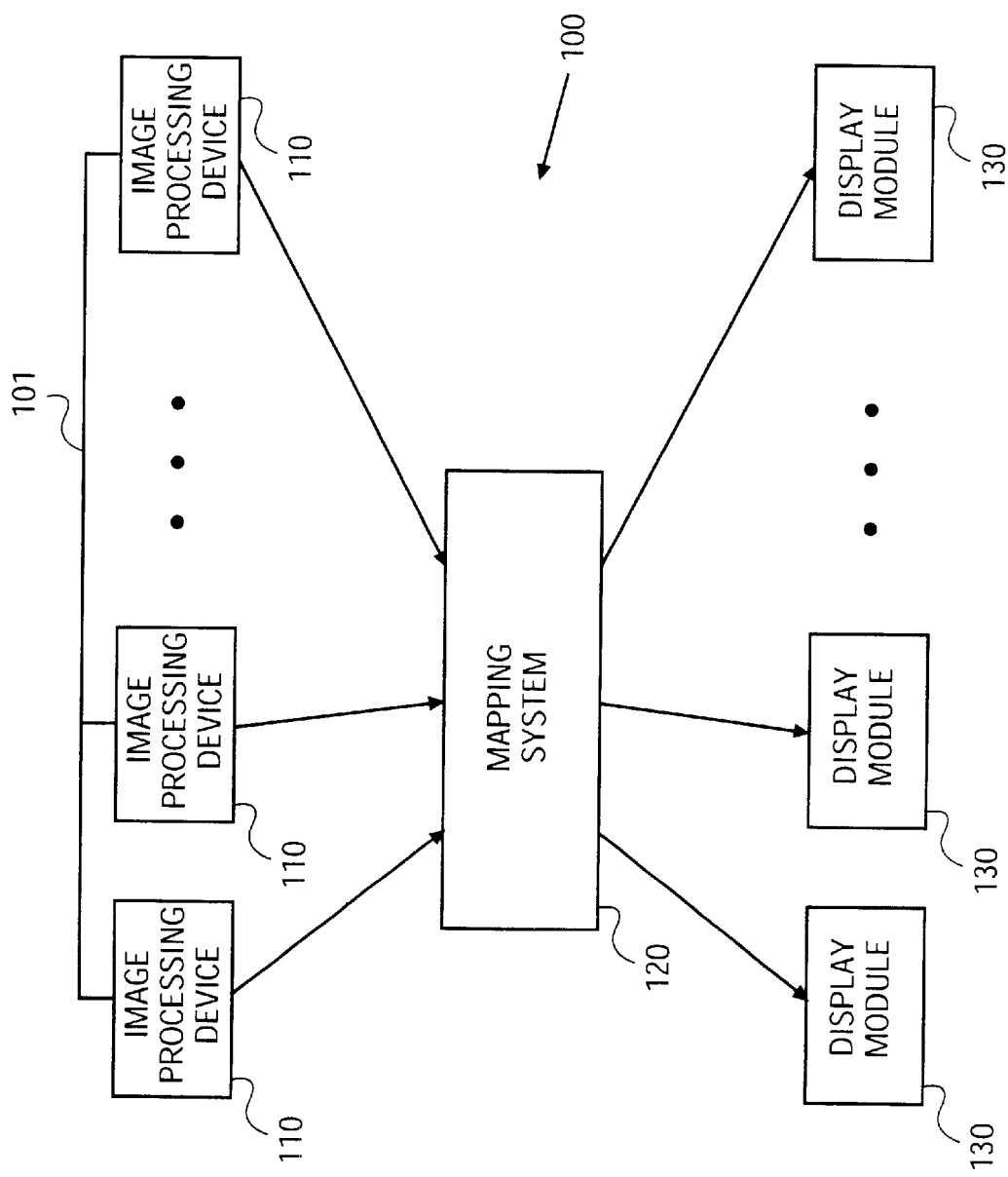
FIG. 1 is a block diagram of one embodiment for a visual computing architecture.

FIG. 1 is a block diagram of one embodiment for a visual computing architecture. As illustrated in FIG. 1, visual computing architecture 100 includes multiple image processing devices 110, for example personal computer systems, coupled to multiple display modules 130, for example cathode ray tubes (CRT) or liquid crystal displays (LCD), via mapping system 120. In one embodiment, image processing devices 110 are synchronized and are coupled via a network 101, for example a local area network (LAN), or any other type of available network. In one embodiment, the network 101 is a low-latency network allowing synchronization messages to be transmitted among image processing devices 110. The network 101 also provides a predetermined high bandwidth to accommodate the synchronization messages among the image processing devices 110.

In one embodiment, image processing devices 110 transmit image information to the mapping system 120. In one embodiment, the image information is transmitted in digital format.

In one embodiment, the mapping system 120 processes the image information and stores image units contained within the image information, for example pixels of data, according to mapping information embedded within the image information. In one embodiment, the mapping information specifies target locations in the output display space of each display module 130 for each image unit within the transmitted image information. Subsequently, mapping system 120 transmits the image units, for example pixels containing color information, to one or more corresponding display modules 130 based on the mapping information retrieved from the image information. In one embodiment, the image units are transmitted in digital format for display on the output display space of display modules 130.

FIG. 2A is a block diagram of an example of the visual computing architecture, having one image processing device and one display module. As illustrated in FIG. 2A, image processing device 110 transmits image information to mapping system 120, which processes, stores and transmits all image units within the image information to display module 130.

FIG. 2B is a block diagram of an alternate example of the visual computing architecture, having multiple image processing devices and one display module. As illustrated in FIG. 2B, image processing device 111 sends image information A to the mapping system 120. Similarly, image processing devices 112 and 113 transmit image information B and C, respectively, to the mapping system 120. In one embodiment, image processing devices 111 through 113 are coupled via a network 101, for example a local area network (LAN), or any other type of available network.

In one embodiment, the mapping of image units in the display space of any display module 130 is dynamic, i.e. can change on a frame-by-frame basis. After processing the image information, mapping system 120 transmits image units contained within image information A to predetermined areas A of the display space of display module 130 based on the retrieved mapping information. Similarly, mapping system 120 transmits image units contained within image information B and C to corresponding areas B and C of the display space of display module 130. In one embodiment, image units contained within image information A, B, and/or C are interspersed to create an image on the output display space of display module 130. Alternatively, any image unit in the output display space of any display module 130 can be transmitted by any image processing device 111–113.

Figure 2C:
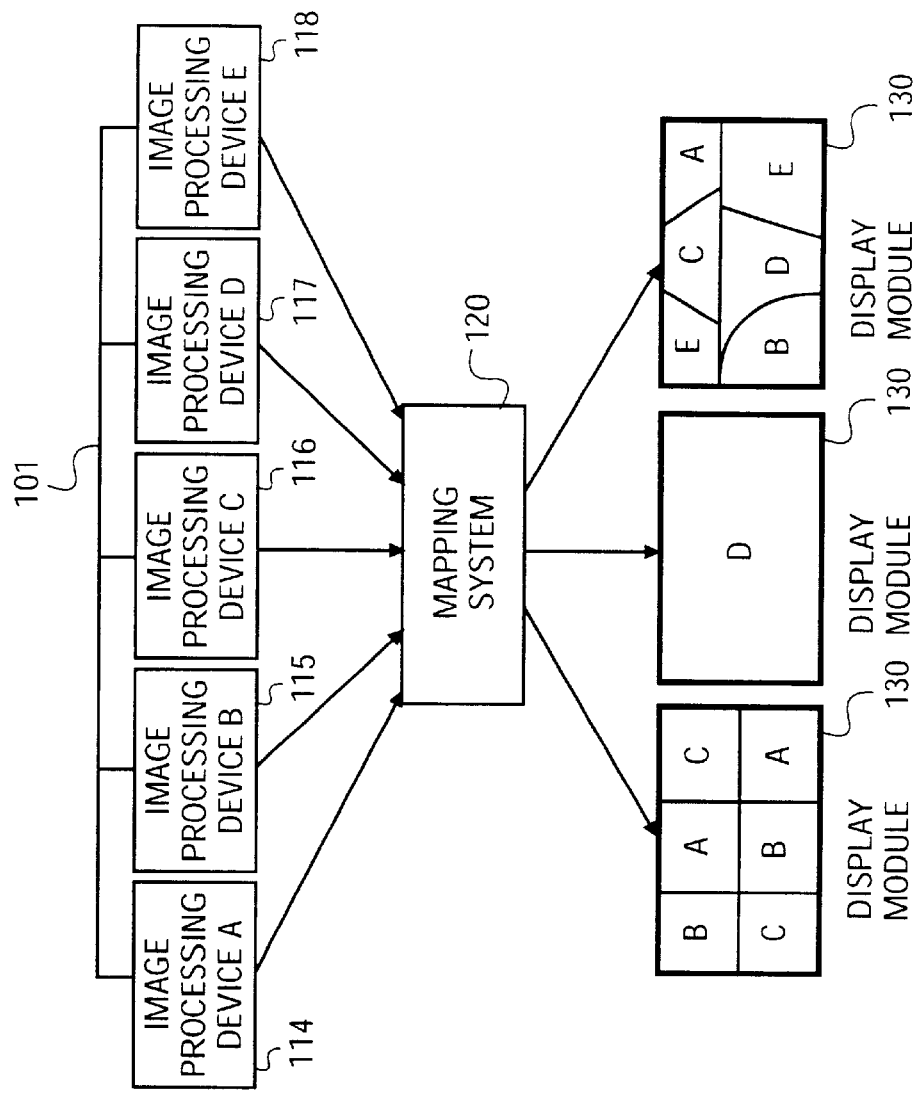
FIG. 2C is a block diagram of an alternate example of the visual computing architecture, having multiple image processing devices and multiple display modules.

FIG. 2C is a block diagram of an alternate example of the visual computing architecture, having multiple image processing devices and multiple display modules. As illustrated in FIG. 2C, image processing devices 114 through 118 transmit respective image information A through E to mapping system 120. In one embodiment, image processing devices 114 through 118 are coupled via network 101, for example a local area network (LAN), or any other type of available network.

Similarly, in one embodiment, the mapping of image units in the display space of any display module 130 is dynamic, i.e. can change on a frame-by-frame basis. After processing and storing the image units contained within the image information, mapping system 120 transmits image units contained in any image information A through E to corresponding areas A through E within the display space of any display module 130 based on the retrieved mapping information, as shown in FIG. 2C. Image units contained in image information A through E may be interspersed within the display space of one display module 130, may occupy the entire display space of one display module 130, or may not be present in some display spaces of certain display modules 130. Alternatively, any image unit in the output display space of any display module 130 can be transmitted by any image processing device 110.

Figure 3:
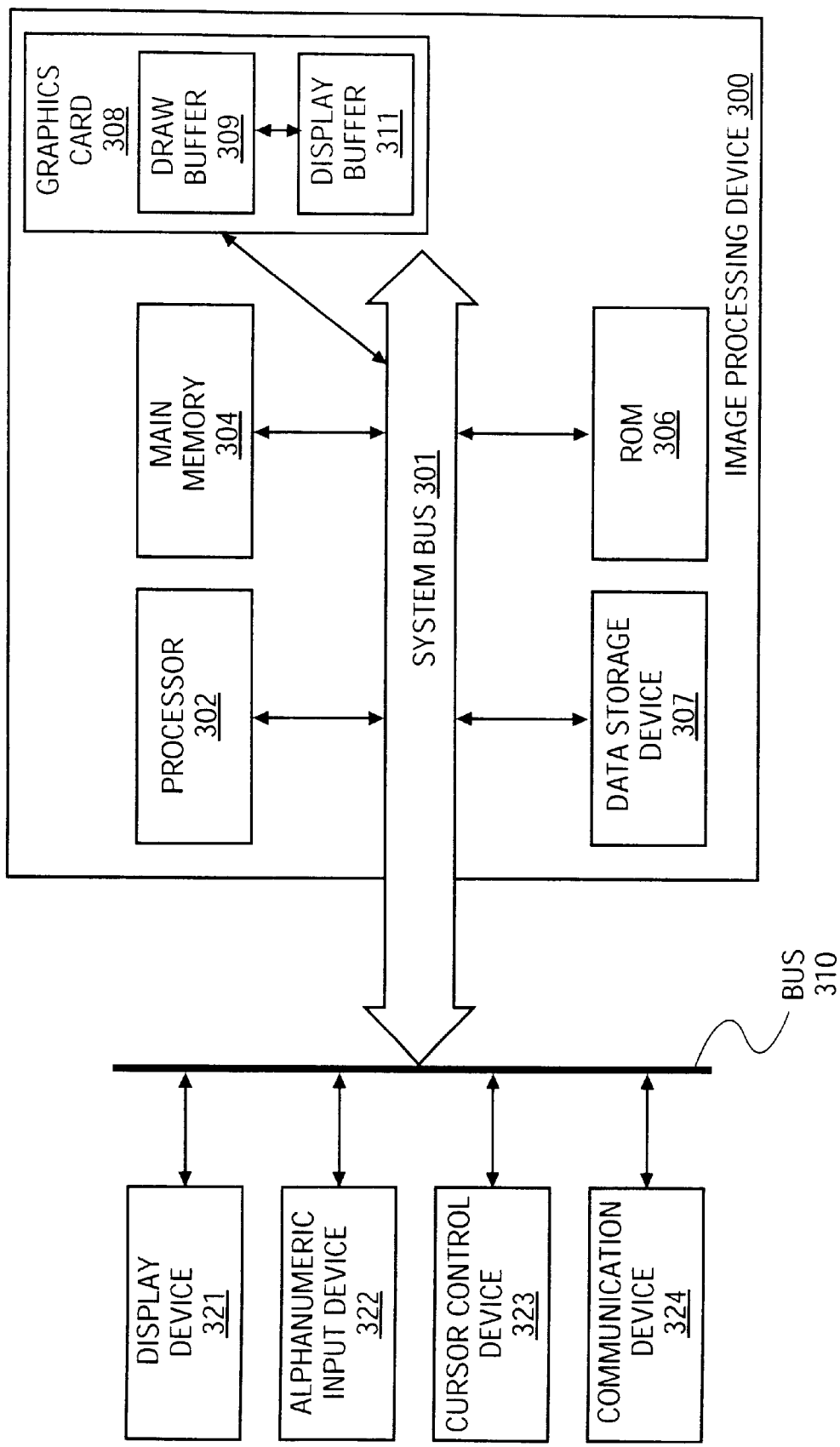
FIG. 3 is a block diagram of one embodiment for a computer system.

FIG. 3 is a block diagram of one embodiment for a computer system 300 illustrating an exemplary image processing device 110.

As illustrated in FIG. 3, in one embodiment, computer system 300 includes a system bus 301, or other communications module similar to the system bus, for communicating information, and a processing module, such as processor 302, coupled to bus 301 for processing information. Computer system 300 further includes a main memory 304, such as a random access memory (RAM) or other dynamic storage device, coupled to bus 301, for storing information and instructions to be executed by processor 302. Main memory 304 may also be used for storing temporary variables or other intermediate information during execution of instructions by processor 302.

In one embodiment, computer system 300 also comprises a read only memory (ROM) 306, and/or other similar static storage device, coupled to bus 301, for storing static information and instructions for processor 302.

In one embodiment, an optional data storage device 307, such as a magnetic disk or optical disk, and its corresponding drive, may also be coupled to computer system 300 for storing information and instructions. System bus 301 is coupled to an external bus 310, which connects computer system 300 to other devices. In one embodiment, computer system 300 can be coupled via bus 310 to a display device 321, such as a cathode ray tube (CRT) or a liquid crystal display (LCD), for displaying information to a computer user. For example, graphical or textual information may be presented to the user on display device 321. Typically, an alphanumeric input device 322, such as a keyboard including alphanumeric and other keys, is coupled to bus 310 for communicating information and/or command selections to processor 302. Another type of user input device is cursor control device 323, such as a conventional mouse, touch mouse, trackball, or other type of cursor direction keys, for communicating direction information and command selection to processor 302 and for controlling cursor movement on display 321. In one embodiment, computer system 300 may optionally include video, camera, speakers, sound card, and many other similar conventional options.

A communication device 324 is also coupled to bus 310 for accessing remote computers or servers, such as computers via LAN or servers via the Internet, for example. The communication device 324 may include a modem, a network interface card, or other well-known interface devices, such as those used for interfacing with Ethernet, Token-ring, or other types of networks.

In one embodiment, computer system 300 further includes a graphics card 308 coupled to system bus 301 for transmitting image information to mapping system 120. In one embodiment, the graphics card 308 includes two frame buffers 309, 311 configured to store alternate frames of image information. Alternatively, graphics card 308 may include multiple frame buffers, similar to frame buffers 309, 311. In another alternate embodiment, computer system 300 may include several graphics cards 308, each graphics card 308 containing multiple frame buffers. In one embodiment, the image information stored within the frame buffers 309, 311 contains image units, for example pixels of data, and associated mapping information.

In one embodiment, at any given time, one frame buffer, for example draw buffer 309, receives and stores a new frame of image information, while the other frame buffer, for example display buffer 311, displays a previously stored frame on the display device 321 or any other display device. After the new frame is stored within draw buffer 309 and the previously stored frame is transmitted to the display device, frame buffers 309, 311 are swapped. Draw buffer 309 becomes a display buffer and starts transmitting the newly stored frame to the display device, while display buffer 311 becomes a draw buffer and starts storing another frame of image information.

Figure 4:
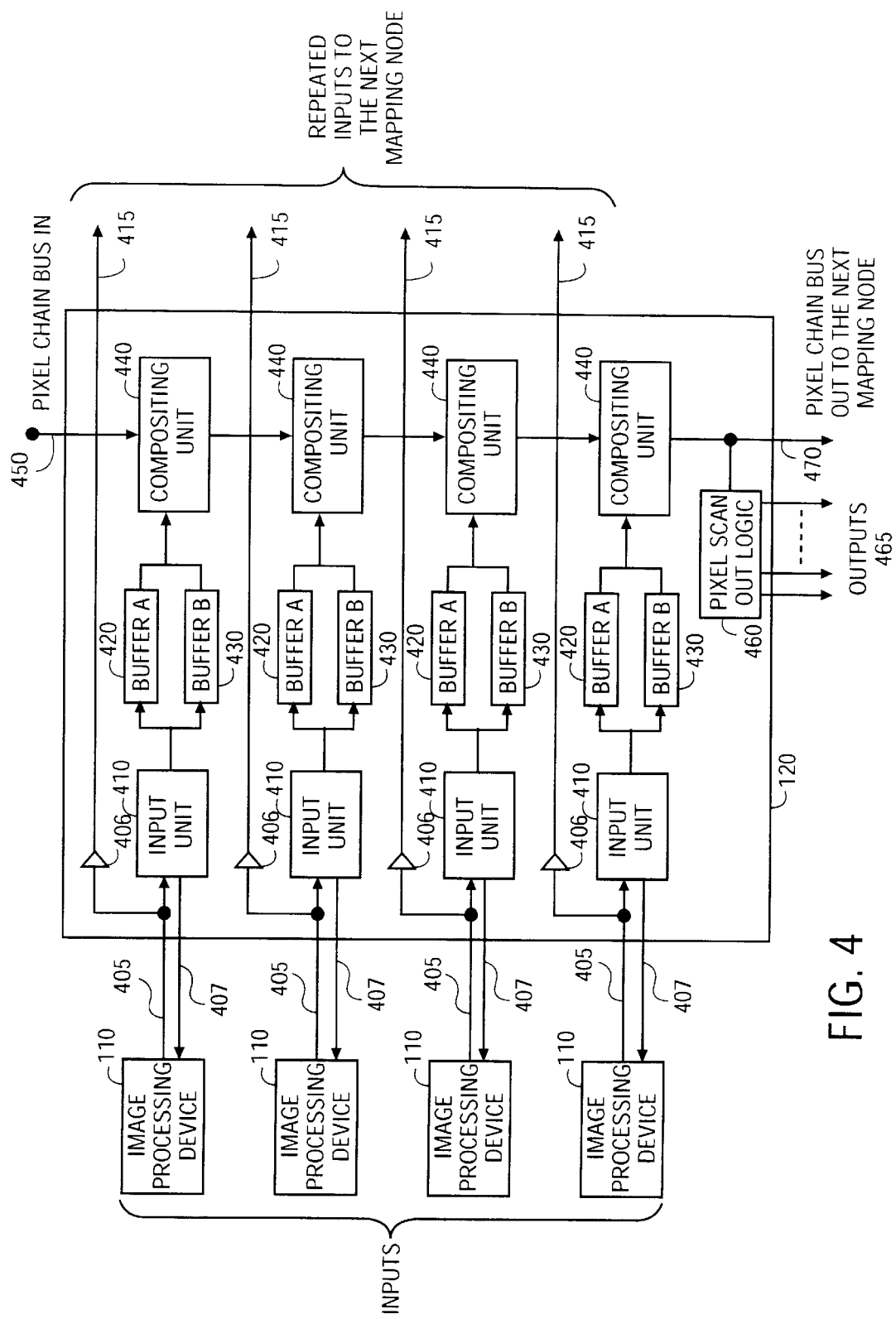
FIG. 4 is a block diagram of one embodiment for a system for parallel rendering of images within the visual computing architecture.

FIG. 4 is a block diagram of one embodiment for a mapping system 120 for parallel rendering of images within the visual computing architecture 100. As illustrated in FIG.

4, in one embodiment, mapping system 120 receives image information from multiple image processing devices 110 through a set of input links or inputs 405. In FIG. 4, four image processing devices 110 are shown, but it is to be understood that any number of image processing devices 110 may be coupled to the mapping system 120. In one embodiment, mapping system 120 receives streams of image information in digital format through the set of inputs 405.

In one embodiment, each stream of image information includes multiple image units, each image unit containing color information, and mapping information coupled to the image units, which specifies target locations in the output display space of display modules 130 for every image unit within the image information. The mapping information is embedded within each stream of image information. In one embodiment, each stream of image information further includes compositing information, which specifies a type of compositing operation to be performed on the color information of one or more image units. The compositing information is coupled to the image units and resides in a field within each stream of image information. The mapping information and compositing information will be described in further detail below.

In one embodiment, mapping system 120 further includes an input unit 410 for each stream of image information. The input unit 410, for example a decoder device, receives via a digital interface the incoming stream of image information transmitted from an image processing device 110 along an input link 405 and decodes the image information to obtain and filter out the embedded mapping information. In one embodiment, each input unit 410 communicates with the corresponding image processing device 110 through a back-channel communication link 407, for example a serial connection, which accommodates messages sent by the input unit 410.

In one embodiment, mapping system 120 further includes buffers 420 and 430 for storing the image units, for example pixels of data, contained within each stream of image information. Each buffer 420 and 430 has a predetermined capacity to hold an entire frame of pixels of data for the entire output display space across all output display modules 130. Buffers 420,430 allow one frame to be stored while another frame is composited together with frames captured by other input units 410, as described in further detail below.

In one embodiment, one buffer, for example buffer 420, is a draw buffer, which receives and stores color information and compositing information for the image units within the stream of image information. The other buffer, for example buffer 430, is a display buffer, which transmits previously stored information to the display modules 130. In one embodiment, each pair of buffers 420 and 430 corresponding to each stream of image information received along inputs 405 is capable of supplying image units to any target location in the output display space within display modules 130.

In one embodiment, as the incoming streams of image information are processed within input units 410, each image unit or pixel is stored into one specific memory location within the draw buffer 420. Each stored pixel data includes both color information and compositing information, for example an operator indicating one or more compositing operations to be performed on the pixel's color information. The specific location of the stored pixel information within the draw buffer 420 is based on the pixel's corresponding target location in the output display space.

When the entire associated frame data from each input 405 has been assembled into the corresponding draw buffer 420, buffers 420 and 430 are simultaneously swapped. Subsequently, pixel data is scanned out from the buffers 420, which become display buffers, while each buffer 430 becomes a draw buffer and proceeds to store a new frame of image information. In one embodiment, the swapping of the buffers 420,430 within the mapping system 120 is synchronized with the transmission of pixels of data, as described in further detail below.

In one embodiment, mapping system 120 further includes a compositing unit 440, for example a pixel processing module, corresponding to each stream of image information, each compositing unit 440 being coupled to respective buffers 420,430.

In one embodiment, the compositing unit 440 receives the pixel data scanned out from the current display buffer 430 and processes the pixel data to allow only valid pixels to be transmitted to the display modules 130. Alternatively, compositing unit 440 may perform other compositing operations on the color information of each pixel, as dictated by the compositing information associated with each pixel.

In one embodiment, each compositing unit 440 receives pixel data from display buffer 430 and compares it with pixel data received along pixel chain bus 450 from other compositing units 440 located on different streams of image information and corresponding to different image processing devices 110. Each target location in the output display space within the display modules 130 corresponds to one memory location in each display buffer 430 within mapping system 120. As pixels are scanned out of each memory location of each display buffer 430, and are received within the respective compositing unit 440, only one set of pixel data from one corresponding memory location will be valid, while all the other pixels will be marked invalid. The valid pixel data is then transmitted along the pixel chain bus 450 in raster order to its destination location in the output display space of display modules 130. Pixels for different display modules 130 are multiplexed on the pixel chain bus 450 on a clock-by-clock basis.

In one embodiment, pixel chain bus 450 is several pixels wide, for example eight pixels wide (256 bits) and runs at a predetermined maximum clock rate, for example a maximum clock rate of 66 MHz. As a result, since each pixel has a predetermined length, for example 32 bits, multiple pixels are processed in parallel as they are serially propagated down the pixel chain bus 450.

In one embodiment, once the last compositing unit 440 along the pixel chain bus 450 has released the valid pixel data, pixels are transmitted to a pixel scan-out logic 460 within mapping system 120, which demultiplexes the pixels and routes the demultiplexed pixels to respective display modules 130 through multiple outputs 465.

In one embodiment, the mapping system 120 illustrated in FIG. 4 has a fixed set of input image processing devices 110, for example four devices 110, transmitting data through four inputs 405, and a fixed set of outputs 465, corresponding to display modules 130. Alternatively, in order to provide scalability and to increase the number of inputs 405 and outputs 465, the mapping system 120 described above is only one mapping node 120 in a cascaded system containing multiple similar mapping nodes 120. In one embodiment, each stream of image information transmitted along inputs 405 is repeated, for example using a repeater module 406, and is further transmitted to another mapping node 120 through repeated inputs 415. Similarly, a pixel chain bus output 470 taps into the last connection of the pixel chain bus 450 prior to the pixel scan-out logic 460 and repeats the pixels carried along the pixel chain bus 450, transmitting the pixels to another mapping node 120.

Figure 5:
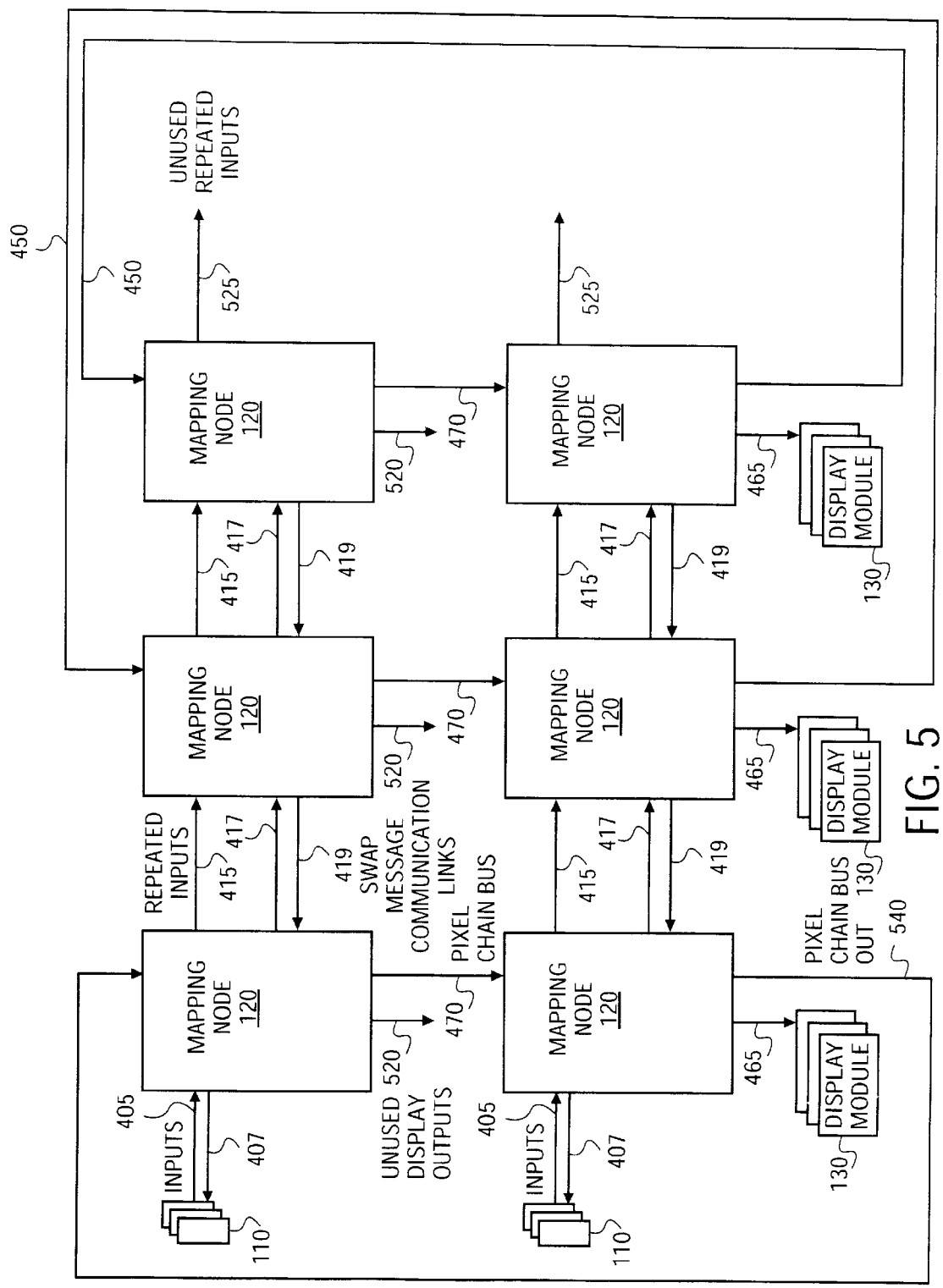
FIG. 5 is a block diagram of one embodiment for a cascaded system for parallel rendering of images within the visual computing architecture.

FIG. 5 is a block diagram of one embodiment for a cascaded system for parallel rendering of images within the visual computing architecture. As illustrated in FIG. 5, multiple mapping nodes 120 are interconnected to form the cascaded system.

In one embodiment, image information transmitted along inputs 405 is repeated within each mapping node 120 creating repeated inputs 415, which are subsequently transmitted to adjacent horizontal mapping nodes 120. The last mapping node 120 in each horizontal chain or row will create unused repeated inputs 525, which are dropped. In one embodiment, pixels scanned out of display buffer 430 within each mapping node 120 are transmitted along pixel chain bus output 470 to adjacent vertical mapping nodes 120. The last mapping node 120 in each vertical chain or column will send the pixels through the pixel scan-out logic 460 to outputs 465 and further to display modules 130. In one embodiment, a pixel chain bus output 540, corresponding to the last mapping node 120 in each column of mapping nodes 120, connects to the pixel chain bus input 450 of the respective first mapping node 120 of each column and transports communication messages exchanged among mapping nodes 120 back up to the first mapping node 120.

In one embodiment, each mapping node 120 within a row of mapping nodes 120 communicates with adjacent mapping nodes 120 through a corresponding pair of swap message communication links 417,419. The communications among the mapping nodes 120 within the cascaded system will be described in further detail below.

Referring also to FIG. 5, more columns containing mapping nodes 120 translate into an increase in the number of outputs 465 and corresponding display modules 130, while more rows containing mapping nodes 120 translate into an increase in the number of inputs 405 and corresponding image processing devices 110.

In one embodiment, any mapping node 120 within the cascaded system allows any target pixel location in the output display space of each display module 130 to be drawn by any image processing device 110. Therefore, each image unit or pixel transmitted from an image processing device 110 may be dynamically mapped from frame to frame into any pixel location in the output display space of any display module 130.

The mapping of each image unit or pixel from any image processing device 110 is accomplished using the mapping information coupled to each pixel and embedded within the stream of image information. In one embodiment, the mapping information and compositing information associated with every pixel of data are included into a header of a strip of associated image units or pixels containing color information, which will be described in further detail below in connection with FIGS. 6, 7.

In one embodiment, a swap set is defined as a collection of image processing devices 110 working on the same application, each image processing device 110 providing a portion of the image to be displayed on an output set of display modules 130. If a swap set provides pixels for more than one output display module 130, the display modules 130 may be driven by more than one column of a matrix of mapping nodes 120.

In one embodiment, when a swap set targets multiple output display modules 130 driven by separate columns of mapping nodes 120, these columns must have similar pixel chain timings, being driven by the same pixel clock. As a result, synchronization pulses of each column of mapping nodes 120 occur at the same time and the outputs 465 connected to the display modules 130 are configured to have the same resolution and refresh rates. Columns having the same pixel chain timings, for example adjacent columns in a matrix of mapping nodes 120, form the output set of corresponding display modules 130.

In order to ensure that the entire image is displayed on the display modules 130, synchronization of image processing devices 110 and mapping nodes 120 within the cascaded system needs to occur.

In one embodiment, each input unit 410 of each mapping node 120 determines whether data is directed to a specific column containing the mapping node 120 based on the mapping information associated with the image units. If the image units are directed to the respective column, each input unit 410 stores the image units in a draw buffer, for example buffer 420. Otherwise, the input unit 410 repeats the image units and transmits them to an input unit 410 of an adjacent mapping node 120 corresponding to the next column of mapping nodes 120 within the swap set.

After the entire frame transmitted by the image processing device 110 is reviewed and processed by input units 410 of the last mapping node 120 in the corresponding row of mapping nodes 120 of the swap set, each input unit 410 of the last mapping node 120 transmits a swap message to the adjacent mapping node 120 through swap message communication link 419. The swap message states that the current frame has been completed and that corresponding buffers 420, 430 are ready to be swapped. Similarly, upon receipt of the swap message and upon processing of the entire frame, each input unit 410 of each mapping node 120 in the row transmits the swap message to an adjacent mapping node 120 via respective communication link 419. When the swap message arrives at the input units 410 of the first mapping node 120 in the row of mapping nodes 120 within the swap set, all mapping nodes 120 in that row have completed the review and processing of the entire frame of image units and are ready to swap corresponding buffers 420, 430. In one embodiment, all mapping nodes 120 in subsequent rows of mapping nodes 120 within the swap set proceed in similar manner to communicate the swap message to the input units 410 of the first mapping node 120 in each row.

In one embodiment, upon receipt of the swap message, each input unit 410 of each first mapping node 120 of each row of mapping nodes within the swap set transmits a back channel message to its corresponding image processing device 110 along the back channel link 407. The back channel message prompts the graphics card 308 within the image processing device 110 to swap buffers 309, 311 and to start drawing the next frame of image units.

At the same time, upon receipt of the swap message, the first input unit 410 of the first mapping node 120 of the first row of mapping nodes in the cascaded system transmits a row synchronization message in a window inserted along the pixel chain bus 470 to an adjacent input unit of the first mapping node 120. The row synchronization message is forwarded along the pixel chain bus 470 to all input units 410 of the mapping nodes 120 of the first column and is subsequently sent back to the first mapping node 120 of the first row of mapping nodes via pixel chain bus output 540. The row synchronization message transmitted along pixel chain bus 470 signals that all input units 410 in the respective row have communicated that respective buffers 420, 430 within mapping nodes 120 are ready to swap.

In one embodiment, upon receipt of the row synchronization message, the first input unit 410 of the first mapping node 120 initiates a second row synchronization message in a window inserted along the pixel chain bus 470 to an adjacent input unit of the first mapping node 120. The second row synchronization message is forwarded along the pixel chain bus 470 to all input units 410 of mapping nodes 120 of the first column indicating that respective buffers 420, 430 in all rows are ready to swap. At the same time, each input unit 410 of each mapping node 120 of the first column of mapping nodes within the swap set sends a swap set message to an input unit 410 of an adjacent mapping node 120 in the same row via communication link 417. The swap set message prompts each mapping node 120 to swap buffers 420,430 when ready.

In one embodiment, a synchronization signal is generated by each mapping node 120 to indicate that each display module 130 within the output set of display modules 130 has received the image units of the current frame and is also ready for the swap of each pair of buffers 420, 430 and to display the next frame. The synchronization signal is generated by each mapping node 120 of the first row of mapping nodes 120, and is transmitted down to each mapping node 120 in each row to indicate that buffers 420,430 may be swapped. Subsequently, buffer 430 within each mapping node 120 becomes the draw buffer and begins to store the new frame transmitted by image processing devices 110.

Figure 6:
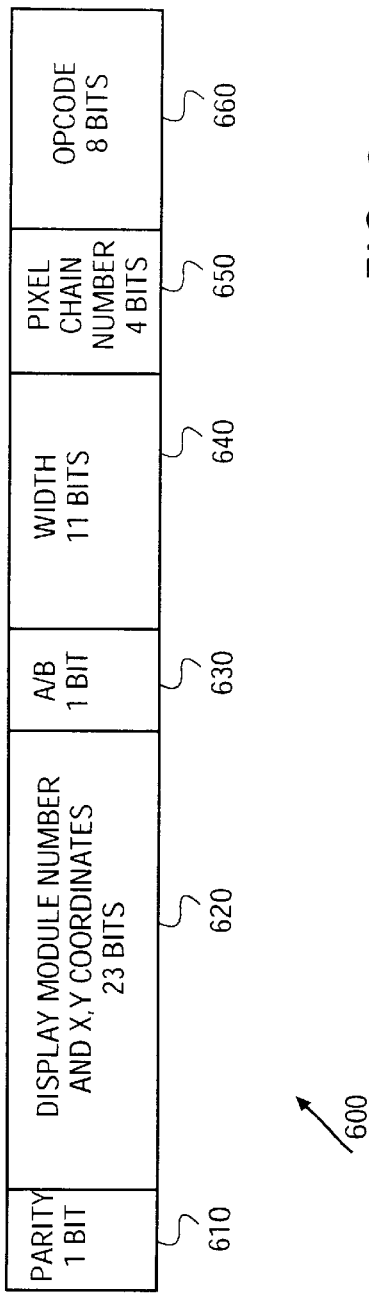
FIG. 6 is a block diagram of one embodiment for a header associated with a predetermined number of image units to be displayed.

FIG. 6 is a block diagram of one embodiment for a header associated with a predetermined number of image units to be displayed. As illustrated in FIG. 6, in one embodiment, the mapping information and compositing information of header 600 associated with a predetermined number of pixels of data is located within the first two pixel locations, such as the first 48 bits, of every horizontal scan line stored within buffer 309 or 311 of each image processing device 110. Alternatively, additional mapping and compositing information 600 may be located within each scan line and may be associated with a predetermined number of pixels that follow.

In one embodiment, in the cascaded system described in connection with FIG. 5, each column of mapping nodes 120 corresponds to one pixel chain bus 450 and associated outputs 465 and display modules 130. In order to direct each pixel to a corresponding output, and further to a target location in the output display space of a display module 130, the pixel chain bus 450, the output 465, and X and Y coordinates of the target location in the coordinate system of the display module 130 attached to output 465 need to be specified within the header 600.

In one embodiment, header 600 includes a parity field 610, for detecting errors in the transmission of header 600 and instructing mapping node 120 to drop the entire frame following the header 600. In one embodiment, the parity field 610 is a single bit field.

In one embodiment, header 600 further includes a display module number and X, Y coordinates field 620, which is a combined 23-bit address that provides the target output display coordinates of the first pixel following the header 600 for a specific pixel chain bus 450. Alternatively, the address within field 620 may contain a different predetermined number of bits. In one embodiment, the bits corresponding to the display module number specify the target output 465. The bits corresponding to the X, Y coordinates specify the location of the first pixel following the header 600. Subsequent pixels associated with the same header 600 are adjacent and progress in the positive X direction. However, all pixels share the same Y coordinate, being located on the same horizontal scan line in the output display space of the display module 130.

In one embodiment, field 620 further includes a sequence bit, which indicates the current frame being stored in the draw buffer 420 or 430. The sequence bit can have a zero or a one value and is associated with the image units corresponding to the current frame. The sequence bit changes each time buffers 420,430 swap and functions to identify at any time whether image units stored in the draw buffer 420 or 430 correspond to the current frame or a previously stored frame.

In one embodiment, header 600 further includes an A/B field 630 indicating in which buffer 420,430 in the mapping node 120 to write the pixel data into. In one embodiment, the A/B field 630 is a single bit field. Alternatively, the A/B field 630 may contain a different number of bits. In one embodiment, if the A/B bit 630 is zero, the pixels are directed to and stored in buffer A 420. Otherwise, if the A/B bit 630 is one, the pixels are directed to and stored in buffer B 430.

In one embodiment, header 600 further includes a width field 640, which specifies the number of pixels associated with the header 600. In one embodiment, the width field 640 is eleven-bit wide, resulting in a maximum of 2048 pixels being associated with any header 600. Alternatively, the width field 640 may have a different predetermined bit value.

In one embodiment, header 600 further includes a pixel chain number field 650, which contains four bits of information corresponding to the vertical chain number within the cascaded system of FIG. 5. Alternatively, field 650 may contain a different predetermined number of bits of information. In one embodiment, the pixel chain number field 650 specifies the pixel chain bus 450 where the pixels associated with the header 600 must be directed. Alternatively, the pixel chain number field 650 contains information directing pixels that are not necessary to a non-existent pixel chain bus 450. Based on this information, these pixels are subsequently repeated and eventually discarded through the unused display outputs 520.

Finally, in one embodiment, header 600 further includes an opcode field 660, which stores the compositing information specifying the compositing operations to be performed on the image units or pixels associated with header 600. In one embodiment, opcode field 660 contains eight bits of information. Alternatively, opcode field 660 may contain a different number of bits. The opcode field 660 will be described in further detail in connection with FIG. 8.

Figure 7:
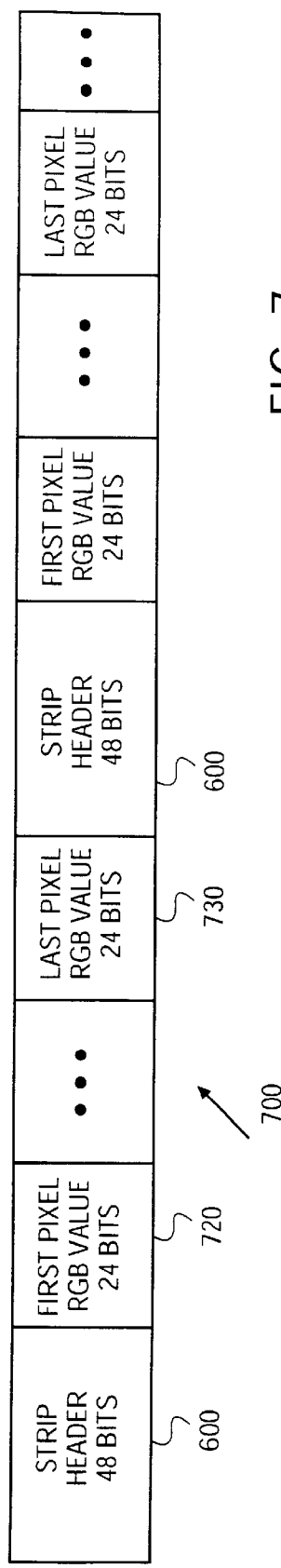
FIG. 7 is a block diagram of one embodiment for a scan line of an image to be displayed.

FIG. 7 is a block diagram of one embodiment for a scan line of an image to be displayed. As illustrated in FIG. 7, scan line 700 includes multiple groups of headers, containing mapping and compositing information, and associated pixels, containing color information, for example RGB values, each group having a header 600 and a number of pixels, for example pixels 720, 730, specified by the width field 640 within header 600. After counting the number of pixels associated with header 600 located at the beginning of the scan line 700, including first pixel 720 and last pixel 730, a new header 600 may be placed after last pixel 730, the new header 600 having its own set of associated pixels on the same scan line 700. In one embodiment, each pixel 720, 730 contains 24 bits of color information. Alternatively, pixels 720, 730 may contain a different predetermined number of bits.

In one embodiment, as scan lines 700 are received at the mapping system 120, input unit 410 decodes the image information according to the format described above. The mapping information contained in header 600 is decoded and filtered out, and pixels 720, 730 are stored in one of buffers 420 or 430 designated as draw buffer together with the compositing information. Each pixel is stored in a buffer location corresponding to the target location on the output display space of a display module 130.

In one embodiment, after pixels are scanned out of buffer 420 or 430 and transmitted to the compositing unit 440, the compositing unit 440 determines the validity of each pixel and selects the valid pixels to be transmitted to the display modules 130. Alternatively, compositing unit 440 may perform other compositing operations on the color information of each pixel, as described in further detail below.

Figure 8:
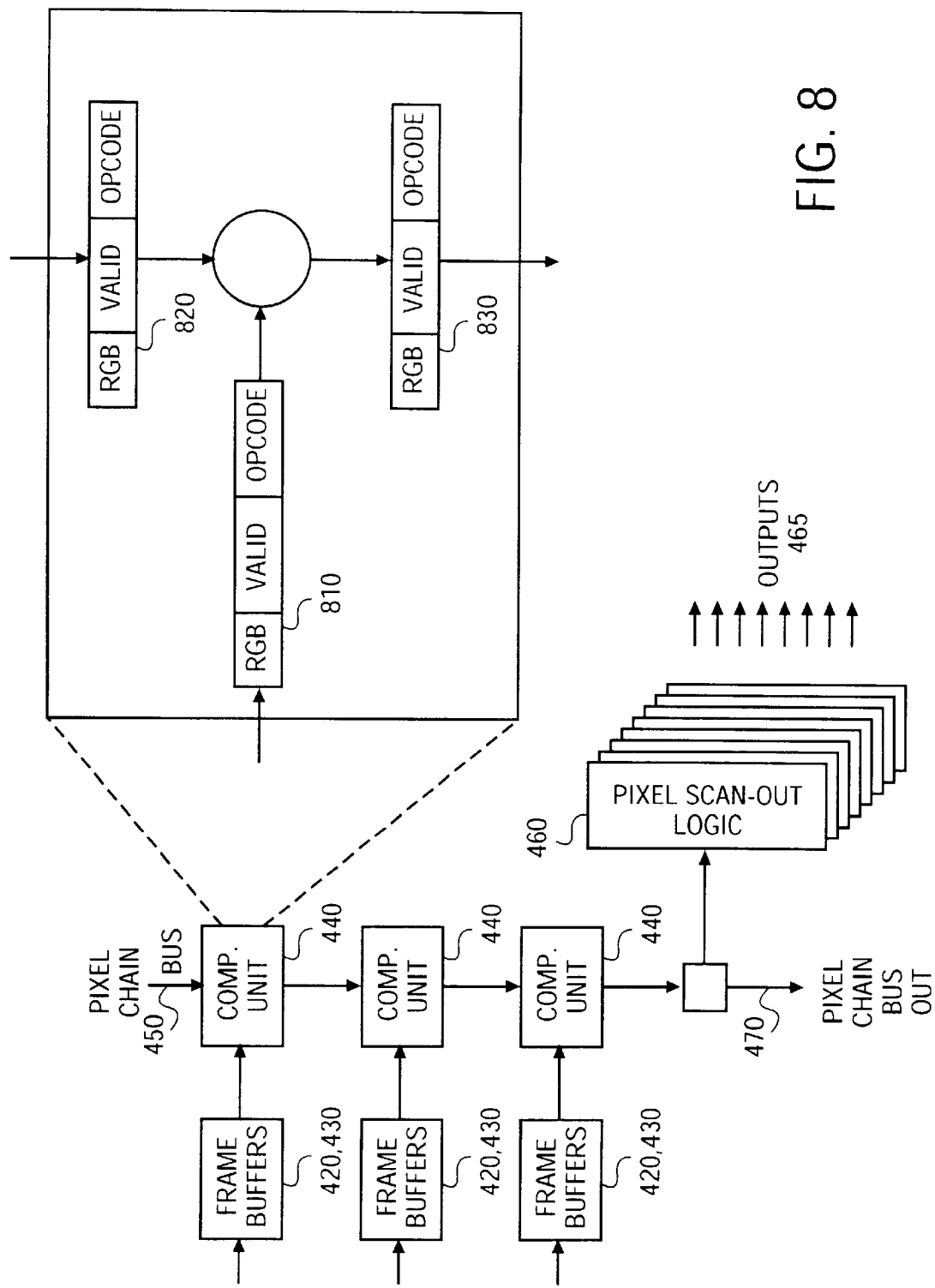
FIG. 8 is a block diagram of one embodiment for a method for determining validity of image units to be displayed.

FIG. 8 is a block diagram of one embodiment for a method for determining validity of image units to be displayed. As illustrated in FIG. 8, compositing unit 440 receives pixels 810 from one of the buffers 420, 430. At the same time, compositing unit 440 also receives pixels 820 along the pixel chain bus 450. In one embodiment, each pixel 810 and 820 includes color information, for example RGB values, a validity field specifying whether the pixel is valid or not, and the opcode field 660 containing the compositing information for the pixel of data.

In one embodiment, only one set of pixel data from one corresponding memory location will be valid, while all the other pixels will be marked invalid. Based on the validity field information and the compositing information, compositing unit 440 marks the pixel as valid or invalid. The valid pixel data 830 is then transmitted along pixel chain bus 450 to its destination location in the output display space of the display modules 130.

For example, in one embodiment, one image processing device 110 transmits pixels directed to a first window within the output display space of a display module 130, while another image processing device 110 transmits pixels directed to a second window within the output display space of the display module 130, the second window overlapping the first window within the output display space. As a result, both sets of pixels are marked valid within the validity field. However, the compositing information within opcode field 660 specifies which set of pixels should actually be displayed in the output display space. As a result, the compositing unit 440 uses this information to direct the valid set of pixels that must be displayed to the output display space of the corresponding display module 130.

The compositing unit 440 may perform other compositing operations on the color information of each pixel, as specified by the compositing information within the opcode field 660. For example, in one embodiment, one image processing device 110 transmits pixels directed to content of a window within the output display space of a display module 130. Another image processing device 110 transmits pixels directed to a border of the window and sends all other pixels drawn in a predetermined color. The opcode field 660 of the pixels drawn in the predetermined color specifies that the color is invalid and instructs the compositing unit 440 to treat that color as invalid. As a result, the compositing unit 440 marks as valid the pixels transmitted by the first image processing device 110, which are directed to the content of the window, and the pixels transmitted by the second image processing device 110, which are directed to the border of the window. The compositing unit 440 then marks as invalid and discards all other pixels, including the pixels drawn in the predetermined color. It is to be understood that the operations described above are only examples of compositing operations, and that other operations may be performed by the compositing unit 440 based on the compositing information stored within the opcode field 660.

Figure 9:
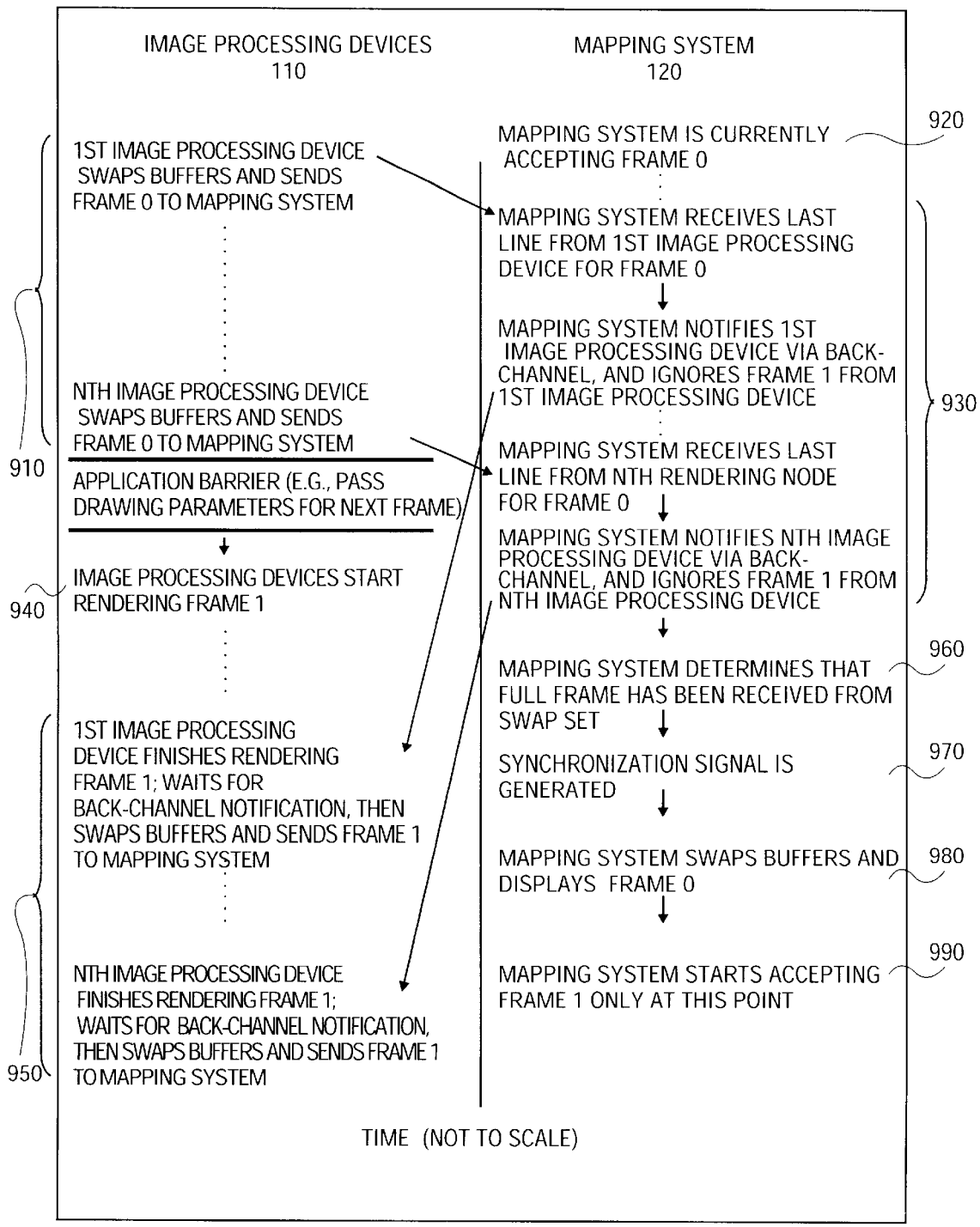
FIG. 9 is a state diagram of one embodiment for a method for synchronizing a double-buffered application among multiple inputs of the system for parallel rendering of images and multiple image processing devices.

FIG. 9 is a state diagram of one embodiment for a method for synchronizing a double-buffered application among multiple inputs of the system for parallel rendering of images and multiple image processing devices. As illustrated in FIG. 9, on the image processing side, at state 910, each image processing device 110, from the first to the Nth, swaps buffers 309, 311 and sends a current frame, for example frame 0 to mapping system 120, for example mapping system 120 described in connection with FIG. 4 or cascaded system described in connection with FIG. 5.

On the mapping system side, at state 920, the mapping system 120 starts accepting and storing frame 0 transmitted by the image processing devices 110 in each current draw buffer, for example buffer 420. At state 930, mapping system 120 receives the last line of frame 0 from each image processing device 110 and notifies each image processing device 110 that it has received the last line via back channel link 407. At the same time, mapping system 120 ignores the next frame, for example frame 1, transmitted by the image processing devices 110.

Back to the image processing side, at state 940, after an application barrier, where drawing parameters for the next frame are passed to each image processing device 110, image processing devices 110 start rendering frame 1 in respective draw buffers 309. At state 950, each image processing device 110 finishes rendering frame 1 in corresponding draw buffer 309 and waits for the back channel message from the mapping system 120. When the back channel message is received along back channel link 407, each image processing device 110 swaps corresponding buffers 309, 311 and sends newly rendered frame 1 to mapping system 120.

At the same time, on the mapping system side, at state 960, after the mapping system 120 has received the last line from each image processing device 110, it determines that the full frame 0 has been received from the image processing devices 110, which form the current swap set. At state 970, the synchronization signal is generated by the mapping system 120 corresponding to the output set of display modules 130. The synchronization signal indicates that buffers 420, 430 may be swapped. Then, at state 980, mapping system 120 swaps all buffers 420, 430 and starts displaying the frame 0 stored in buffer 420. Finally, at state 990, mapping system 120 starts accepting and storing frame 1 in the current draw buffer, for example buffer 430. The states 910 through 990 are subsequently repeated for frame 1 and the next frame to be rendered by image processing devices 110.

Figure 10:
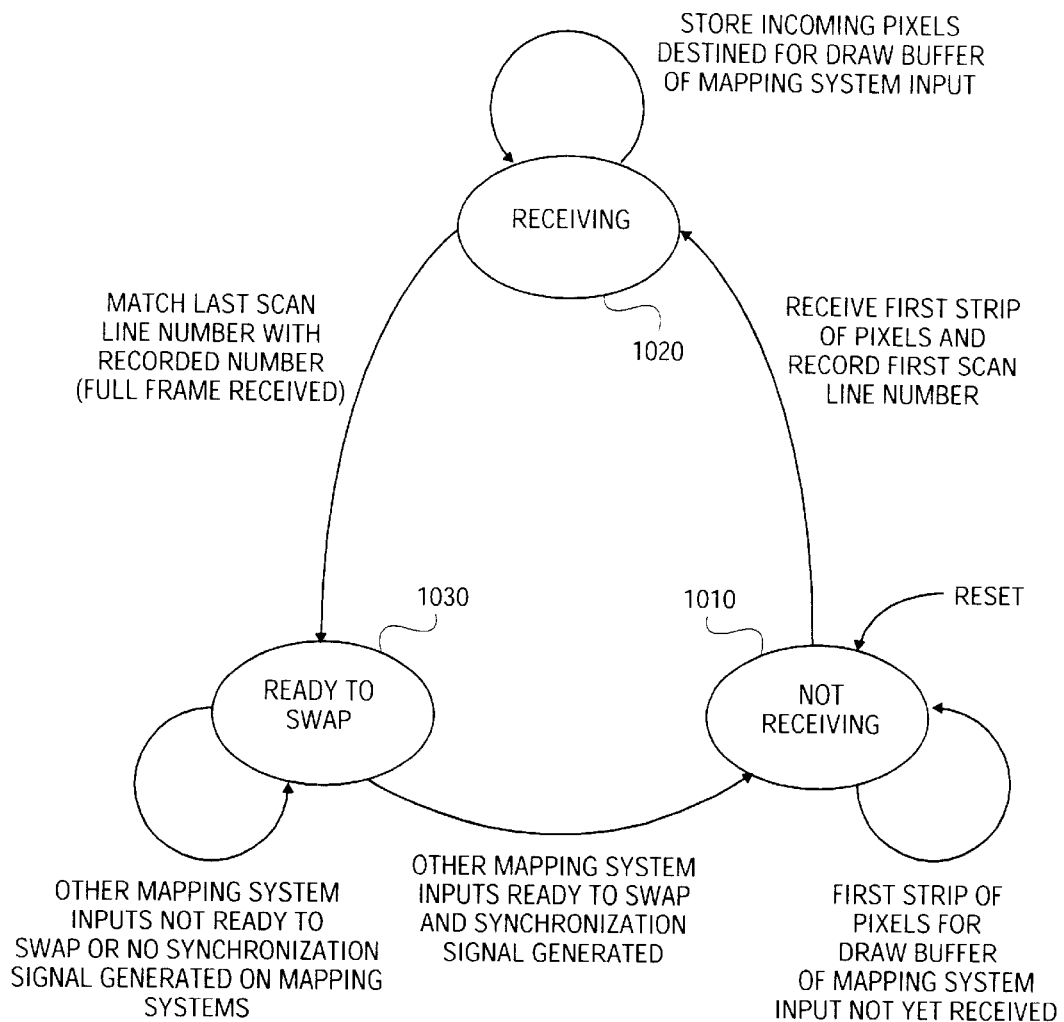
FIG. 10 is a state machine diagram of one embodiment for a method for synchronizing a double-buffered application among multiple inputs of the system for parallel rendering of images.

FIG. 10 is a state machine diagram of one embodiment for a method for synchronizing a double-buffered application among multiple inputs of a mapping system. In one embodiment, each image processing device 110 includes buffers 309, 311 which can alternatively perform the functions of a draw buffer and a display buffer. As illustrated in FIG. 10, for a double-buffered application spread across multiple image processing devices 110, where each image processing device 110 computes a portion of a final image to be displayed on display modules 130, each mapping system input unit 410 starts in the "Not receiving" state 1010, and is idle until it receives a first strip of pixel data for a current draw buffer 420 or 430, for example buffer 420. In state 1010, any incoming strips not destined for buffer 420 are dropped.

In one embodiment, upon receiving a header 600 indicating buffer 420 as destination for the first strip of pixels, mapping system input unit 410 transitions to "Receiving" state 1020. At the same time, mapping system input unit 410 records the number of the first scan line 700 associated with the first strip of pixels received.

In one embodiment, while in the "Receiving" state 1020, mapping system input unit 410 receives and stores incoming pixels in draw buffer 420. In one embodiment, upon counting a predetermined number of scan lines 700, mapping system input unit 410 matches a last received scan line number with the recorded number of the first scan line received.

At that time, realizing that a full frame has been received and stored in draw buffer 420, mapping system input unit 410 transitions into "Ready to swap" state 1030, where it waits until an indication is received that all other mapping system input units 410, which receive image information for the image to be displayed, are ready to swap, and until a synchronization signal is generated. In one embodiment, when the indication that all other mapping system input units 410 are ready to swap and the synchronization signal occurs, a swap is performed in the mapping system 120 and buffer 420 becomes the display buffer, while buffer 430 becomes the current draw buffer designated to store pixel data. Finally, each mapping system input unit 410 transitions back into state 1010 and the cycle is repeated.

Figure 11:
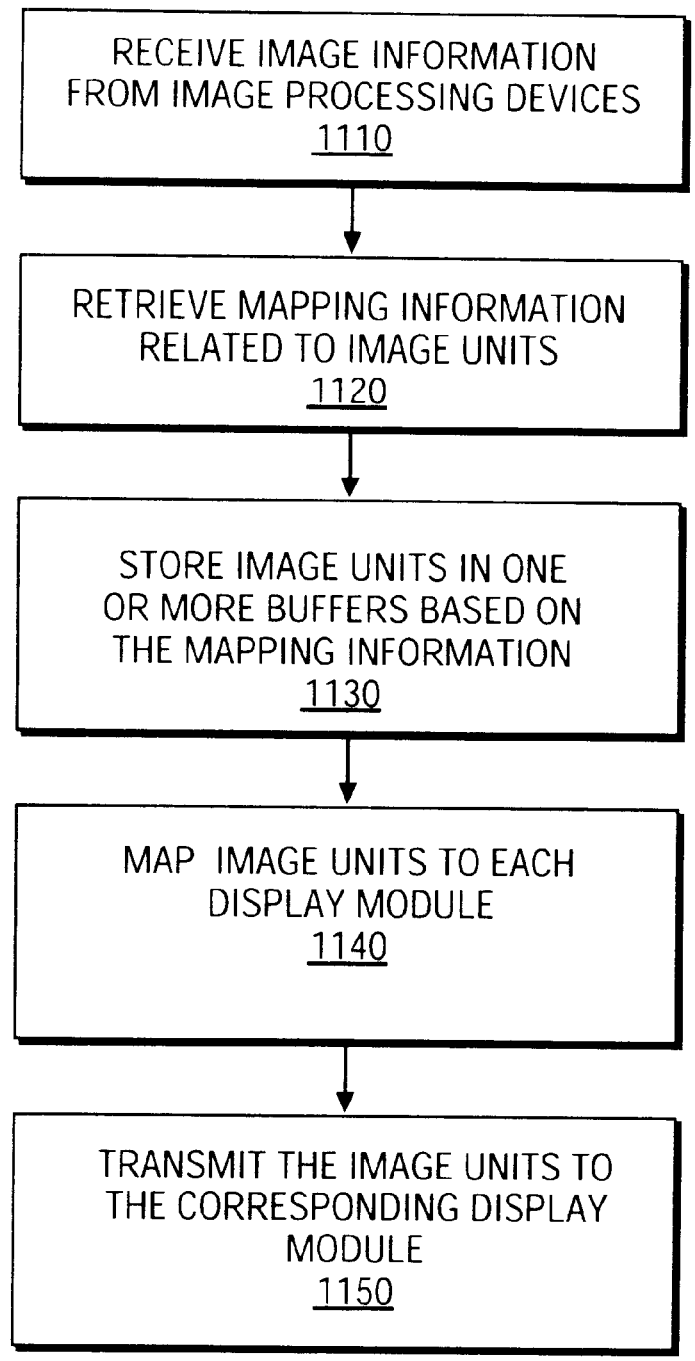
FIG. 11 is a block diagram of one embodiment for a method for parallel rendering of images.

FIG. 11 is a block diagram of one embodiment for a method for parallel rendering of images. As illustrated in FIG. 11, at processing block 1110, image information is received from image processing devices 110.

At processing block 1120, mapping information embedded into the image information and related to image units is retrieved. In one embodiment, each input unit 410 within each mapping node 120 decodes the image information and retrieves the mapping information associated with the image units.

At processing block 1130, image units are stored in one or more buffers based on the retrieved mapping information. In one embodiment, each input unit 410 transmits the image units and compositing information associated with the image units to draw buffer 420 or 430 based on the target locations on the output display space embedded into the retrieved mapping information and based on which one of buffers 420 or 430 is the current draw buffer.

At processing block 1140, a predetermined number of stored image units is mapped to each display module. In one embodiment, image units are scanned out of display buffer 420 or 430 and are transmitted to a compositing unit 440, which performs compositing operations on the information contained within the image units, as specified in the compositing information associated with each image unit, and determines validity of the image units, based on validity information associated with each image unit. Valid image units are then transmitted to a scan-out logic 460, which maps the image units to outputs 465.

Finally, at processing block 1150, the mapped image units are transmitted to the corresponding display module 130 through multiple outputs 465.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   storing image information into at least one buffer for display on a plurality of display modules;
   mapping a predetermined number of image units contained within said image information to each display module of said plurality of display modules;
   retrieving mapping information associated with said image units from said image information; and
   storing said image units in said at least one buffer based on said mapping information, the mapping information is embedded in a header associated with said predetermined number of image units within said image information.

2. The method according to claim 1, further comprising receiving said image information in digital format from at least one image processing device.

3. The method according to claim 1, further comprising transmitting said predetermined number of image units in digital format to said each display module.

4. The method according to claim 1, wherein each image unit is a pixel containing color information.

5. The method according to claim 1, wherein said mapping information specifies at least one target location in a display space of said each display module for each image unit contained within said image information.

6. A system comprising:
   at least one image processing device to transmit image information; and
   a mapping system coupled to said at least one image processing device to store said image information into at least one buffer for display on a plurality of display modules, and to map a predetermined number of image units contained within said image information to each display module of said plurality of display modules, the mapping system retrieves mapping information associated with said image units from said image information, and stores said image units in said at least one buffer based on said mapping information, the mapping information is embedded in a header associated with said predetermined number of image units within said image information.

7. The system according to claim 6, wherein said mapping system further receives said image information in digital format from said at least one image processing device.

8. The system according to claim 6, wherein said mapping system further transmits said predetermined number of image units in digital format to said each display module.

9. The system according to claim 6, wherein each image unit is a pixel containing color information.

10. The system according to claim 6, wherein said mapping information specifies at least one target location in a display space of said each display module for each image unit contained within said image information.

11. A system comprising:
means for storing image information into at least one buffer for display on a plurality of display modules;
means for mapping a predetermined number of image units contained within said image information to each display module of said plurality of display modules;
means for retrieving mapping information associated with said image units from said image information; and
means for storing said image units in said at least one buffer based on said mapping information, the mapping information is embedded in a header associated with said predetermined number of image units within said image information.

12. The system according to claim 11, further comprising means for receiving said image information in digital format from at least one image processing device.

13. The system according to claim 11, further comprising means for transmitting said predetermined number of image units in digital format to said each display module.

14. The system according to claim 11, wherein each image unit is a pixel containing color information.

15. The system according to claim 11, wherein said mapping information specifies at least one target location in a display space of said each display module for each image unit contained within said image information.

16. An apparatus comprising:
at least one input unit to receive image information from at least one image processing device for display on a plurality of display modules and to map a predetermined number of image units contained within said image information to each display module of said plurality of display modules;
at least one buffer coupled to said at least one input unit to store said image units; and
a compositing unit to compare said predetermined number of image units and to transmit valid image units in digital format to said each display module.

17. The apparatus according to claim 16, wherein said at least one input unit receives said image information in digital format.

18. The apparatus according to claim 16, wherein each image unit is a pixel containing color information.

19. The apparatus according to claim 16, wherein said mapping information specifies at least one target location in a display space of said each display module for each image unit contained within said image information.

20. A computer readable medium containing executable instructions, which, when executed in a processing system, cause said system to perform a method comprising:
storing image information into at least one buffer for display on a plurality of display modules;
mapping a predetermined number of image units contained within said image information to each display module of said plurality of display modules;
retrieving mapping information associated with said image units from said image information; and
storing said image units in said at least one buffer based on said mapping information, said mapping information is embedded in a header associated with said predetermined number of image units within said image information.

21. The computer readable medium according to claim 20, wherein said method further comprises receiving said image information in digital format from at least one image processing device.

22. The computer readable medium according to claim 20, wherein said method further comprises transmitting said predetermined number of image units in digital format to said each display module.

23. The computer readable medium according to claim 20, wherein each image unit is a pixel containing color information.

24. The computer readable medium according to claim 20, wherein said mapping information specifies at least one target location in a display space of said each display module for each image unit contained within said image information.

25. An apparatus comprising:
at least one input unit to receive image information from at least one image processing device for display on a plurality of display modules and to map a predetermined number of image units contained within said image information to each display module of said plurality of display modules;
at least one buffer coupled to said at least one input unit to store said image units; and
said input unit further retrieves mapping information associated with said image units from said information, and transmits said image units to said at least one buffer for storage based on said mapping information, said mapping is embedded in a header associated with said predetermined number of image units within said image information.

* * * * *

UNITED STATES PATENT AND TRADEMARK OFFICE
CERTIFICATE OF CORRECTION

PATENT NO. : 6,731,282 B2  Page 1 of 1
DATED : May 4, 2004
INVENTOR(S) : Stoll et al.

It is certified that error appears in the above-identified patent and that said Letters Patent is hereby corrected as shown below:

Column 16,
Line 42, insert -- image -- before the word "information,".
Line 45, insert -- information -- after the word "mapping".

Signed and Sealed this

Thirteenth Day of July, 2004

JON W. DUDAS
*Acting Director of the United States Patent and Trademark Office*